US011577315B2

United States Patent
Yoo et al.

(10) Patent No.: US 11,577,315 B2
(45) Date of Patent: *Feb. 14, 2023

(54) 3D PRINTING METHOD

(71) Applicant: LG Chem, Ltd., Seoul (KR)

(72) Inventors: Dong Woo Yoo, Daejeon (KR); Jin Kyu Lee, Daejeon (KR)

(73) Assignee: LG Chem, Ltd.

(*) Notice: Subject to any disclaimer, the term of this patent is extended or adjusted under 35 U.S.C. 154(b) by 933 days.

This patent is subject to a terminal disclaimer.

(21) Appl. No.: 16/089,164

(22) PCT Filed: Apr. 3, 2017

(86) PCT No.: PCT/KR2017/003615
§ 371 (c)(1),
(2) Date: Sep. 27, 2018

(87) PCT Pub. No.: WO2017/171512
PCT Pub. Date: Oct. 5, 2017

(65) Prior Publication Data
US 2019/0160531 A1    May 30, 2019

(30) Foreign Application Priority Data

Apr. 1, 2016 (KR) .......... 10-2016-0040360
Mar. 30, 2017 (KR) .......... 10-2017-0040973

(51) Int. Cl.
B22F 10/10 (2021.01)
B33Y 10/00 (2015.01)
(Continued)

(52) U.S. Cl.
CPC ............ B22F 10/10 (2021.01); B22F 1/05 (2022.01); B22F 1/062 (2022.01); B22F 1/068 (2022.01);
(Continued)

(58) Field of Classification Search
CPC ............ B33Y 10/00; B22F 1/05–08; B22F 2003/1052; B22F 2003/1054; B22F 2202/07
See application file for complete search history.

(56) References Cited

U.S. PATENT DOCUMENTS 4,333,966 A     6/1982 Deffeyes et al.
5,678,165 A *  10/1997 Wu .......................... B22F 3/227
                                                                  419/36
(Continued)

FOREIGN PATENT DOCUMENTS

CN    102140599 B  *  1/2013
CN    104259391 A     1/2015
(Continued)

OTHER PUBLICATIONS

CN102140599B English translation (Year: 2013).*
(Continued)

Primary Examiner — Anthony J Zimmer
Assistant Examiner — Sean P. O'Keefe
(74) Attorney, Agent, or Firm — Lerner, David, Littenberg, Krumholz & Mentlik, LLP

(57) ABSTRACT

The present application provides a 3D printing method. The present application can provide as a method for efficiently performing 3D printing, for example, a 3D printing method capable of more rapidly and efficiently producing a three-dimensional shape precisely realized up to a fine portion.

14 Claims, 1 Drawing Sheet

(51) Int. Cl.
  *B33Y 40/00*    (2020.01)
  *B22F 3/105*    (2006.01)
  *B22F 1/05*     (2022.01)
  *B22F 1/10*     (2022.01)
  *B22F 1/062*    (2022.01)
  *B22F 1/068*    (2022.01)
  *B22F 1/102*    (2022.01)
  *B33Y 70/10*    (2020.01)
  *B29C 64/165*   (2017.01)

(52) U.S. Cl.
  CPC .............. *B22F 1/10* (2022.01); *B22F 1/102* (2022.01); *B22F 3/105* (2013.01); *B29C 64/165* (2017.08); *B33Y 10/00* (2014.12); *B33Y 40/00* (2014.12); *B33Y 70/10* (2020.01); *B22F 2003/1053* (2013.01); *B22F 2202/07* (2013.01); *B22F 2304/056* (2013.01); *B22F 2304/058* (2013.01); *B22F 2304/10* (2013.01); *B22F 2999/00* (2013.01)

(56) References Cited

U.S. PATENT DOCUMENTS

| | | | |
|---|---|---|---|
| 11,141,786 B2 * | 10/2021 | Yoo | ................. B22F 3/1121 |
| 2007/0241482 A1 | 10/2007 | Giller et al. | |
| 2008/0145566 A1 * | 6/2008 | Cretegny | ................. F01D 5/288 |
| | | | 427/553 |
| 2008/0282537 A1 | 11/2008 | Lee et al. | |
| 2009/0266201 A1 | 10/2009 | Cattaneo et al. | |
| 2009/0302029 A1 | 12/2009 | Krishna et al. | |
| 2010/0300437 A1 * | 12/2010 | Sivigny | ............. A61M 15/0065 |
| | | | 419/23 |
| 2011/0020662 A1 * | 1/2011 | Okamoto | ................ B22F 3/105 |
| | | | 428/566 |
| 2012/0329659 A1 | 12/2012 | Holcomb | |
| 2014/0231266 A1 | 8/2014 | Sherrer et al. | |
| 2015/0306820 A1 | 10/2015 | Colin et al. | |
| 2015/0352785 A1 | 12/2015 | Folgar et al. | |
| 2016/0031157 A1 | 2/2016 | Reep et al. | |
| 2016/0236372 A1 * | 8/2016 | Benichou | ................ B29C 64/40 |

FOREIGN PATENT DOCUMENTS

| | | | |
|---|---|---|---|
| DE | 3015981 A1 * | 11/1981 | |
| JP | H10088201 A | 4/1998 | |
| JP | H11181507 A | 7/1999 | |
| JP | 2009530491 A | 8/2009 | |
| JP | 2015133416 A | 7/2015 | |
| JP | 2016505709 A | 2/2016 | |
| KR | 100268604 B1 | 10/2000 | |
| KR | 20140038483 A | 3/2014 | |
| KR | 20150025865 A | 3/2015 | |
| KR | 20150099691 A | 9/2015 | |
| WO | 2015056230 A1 | 4/2015 | |

OTHER PUBLICATIONS

Search report from International Application No. PCT/KR2017/003615, dated May 23, 2017.
Search Report from Chinese Office Action for Application No. 201780022412.7 dated Jan. 6, 2020; 2 pages.
Extended European Search Report and Written Opinion for EP Application No. 17775936.2, dated Mar. 15, 2019.

* cited by examiner

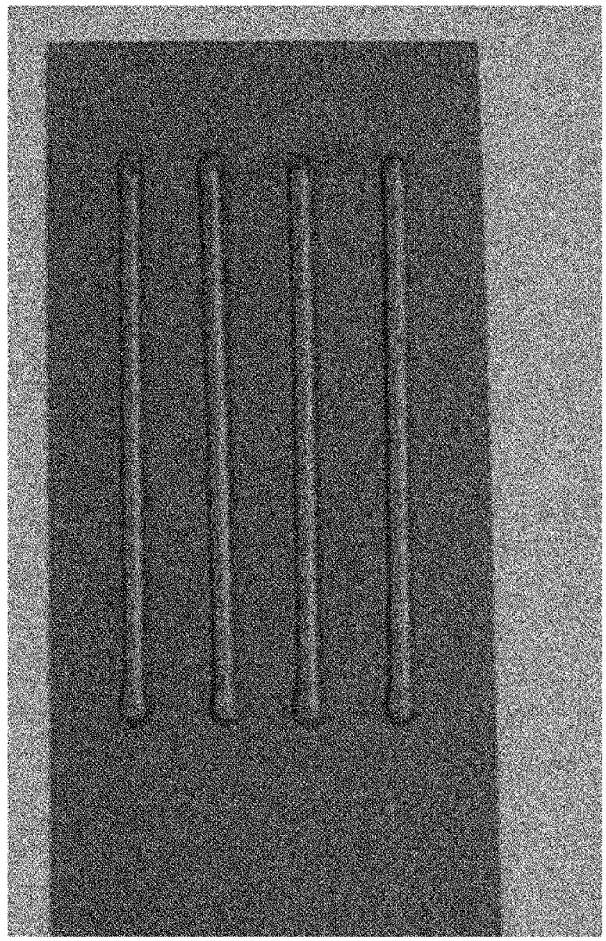

3D PRINTING METHOD

CROSS-REFERENCE TO RELATED APPLICATIONS

The present application is a national phase entry under 35 U.S.C. § 371 of International Application No. PCT/KR2017/003615 filed on Apr. 3, 2017, which claims priority from Korean Patent Application No. 10-2016-0040360 filed on Apr. 1, 2016 and Korean Patent Application No. 10-2017-0040973 filed on Mar. 30, 2017, the disclosures of which are incorporated herein by reference in their entirety.

TECHNICAL FIELD

The present application relates to a 3D printing method.

BACKGROUND ART 3D (three dimension) printing is a variety of manufacturing processes that typically form a 3D object through a process of stacking layers of a series of materials.

As the 3D printing method, a stereolithography method employing an ultraviolet (UV) laser for processing a photosensitive resin, an inkjet printer method using an ultraviolet lamp for processing a photosensitive resin, a plastic extrusion molding method and a liquid binder deposition method, and the like are known.

The 3D printing can be applied to fields such as product development, data visualization, production and manufacture of specialty fields. Applicable fields are multifaceted including construction, architecture (AEC), industrial design, automobile, aerospace industry, engineering, dental and medical industry, biotechnology (human tissue supplement), fashion, footwear, jewelry, eyewear, education, geographic information system, food or many other fields.

DISCLOSURE

Technical Problem

The present application relates to a 3D printing method. It is an object of the present invention to provide a 3D printing method capable of forming a desired three-dimensional form so as to have precise and various properties.

Technical Solution

The 3D printing method of the present application comprises a step of applying an electromagnetic field to a three-dimensional shape molded by using a metal powder containing a specific conductive metal or a slurry containing the conductive metal or metal powder. Here, formation of a three-dimensional shape and application of an electromagnetic field to the three-dimensional shape can be performed simultaneously or with a time difference. For example, molding of a three-dimensional shape using the metal powder or slurry may proceed in an electromagnetic field, or a three-dimensional shape may be formed after passing the metal powder or slurry through at least an electromagnetic field, or once the three-dimensional shape is formed and then the electromagnetic field may be applied to the three-dimensional shape. The conductive metal may be heated by induction heating in an electromagnetic field. Therefore, if the particle diameter or shape of the metal powder, the intensity of the electromagnetic field, the forming method of the three-dimensional shape, and the like are controlled, the metal powder can be melted in a state suitable for holding the three-dimensional shape and sintered in a state of maintaining the three-dimensional shape thus melted. Furthermore, by applying the metal powder or the slurry containing the same as the material for realizing the three-dimensional shape, a more precise and fine form can be realized as desired, and the relevant three-dimensional shape can be promptly formed. Here, the method for molding the three-dimensional form using the metal powder or slurry is not particularly limited, and for example, a spraying or discharging method and the like can be applied.

The metal powder used in the present application is in a powder form, which may comprise a metal as a main component. Here, the fact that a metal is used as a main component means a case where the ratio of metal is 55 wt % or more, 60 wt % or more, 65 wt % or more, 70 wt % or more, 75 wt % or more, 80 wt % or more, 85 wt % or more, 90 wt % or more, or 95 wt % or more based on the total weight. The upper limit of the ratio of metal contained as the main component is not particularly limited and may be, for example, about 100 wt %, 99 wt % or 98 wt % or so.

The metal powder may comprise at least a metal having a predetermined relative magnetic permeability and conductivity. Through the application of such a metal, the metal powder or slurry can be melted and sintered to an appropriate level in an electromagnetic field.

For example, as the metal, a metal having a relative magnetic permeability of 90 or more may be used. The relative magnetic permeability ($\mu_r$) is a ratio ($\mu/\mu_0$) of magnetic permeability ($\mu$) of the relevant material to magnetic permeability (no) in vacuum. The metal may have a relative magnetic permeability of 95 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, 350 or more, 360 or more, 370 or more, 380 or more, 390 or more, 400 or more, 410 or more, 420 or more, 430 or more, 440 or more, 450 or more, 460 or more, 470 or more, 480 or more, 490 or more, 500 or more, 510 or more, 520 or more, 530 or more, 540 or more, 550 or more, 560 or more, 570 or more, 580 or more, or 590 or more. The higher the relative magnetic permeability is, the higher the heat is generated upon application of an electromagnetic field for induction heating to be described below, and thus the upper limit is not particularly limited. In one example, the upper limit of the relative magnetic permeability may be, for example, about 300,000 or less.

The metal may be a conductive metal. The term conductive metal may mean a metal or an alloy thereof having a conductivity of about 8 MS/m or more, 9 MS/m or more, 10 MS/m or more, 11 MS/m or more, 12 MS/m or more, 13 MS/m or more, or 14.5 MS/m or more. Although the upper limit of the conductivity is not particularly limited, for example, the conductivity may be set to about 30 MS/m or less, 25 MS/m or less, or 20 MS/m or less in order to control a heat generation degree in an electromagnetic field.

In the present application, the metal having the relative magnetic permeability and conductivity as above may also be simply referred to as a conductive magnetic metal.

By applying the conductive magnetic metal, melting and sintering under an electromagnetic field can be effectively performed. Such a metal can be exemplified by nickel, iron or cobalt, and the like, but is not limited thereto.

The shape of the conductive magnetic metal can also be controlled variously and can be selected to be suitable for implementing the three-dimensional shape. For example, the conductive magnetic metal may be particles, where the relevant particle may have a shape such as a spherical, flake, ellipsoid, needle or dendritic shape. In this shape, it can be effectively melted and sintered in an electromagnetic field to form the desired three-dimensional shape well.

The metal powder may comprise together with the conductive magnetic metal a second metal different from the metal, if necessary. In this case, the three-dimensional shape may be formed of a metal alloy. As the second metal, a metal having a relative magnetic permeability and/or conductivity in the same range as the above-mentioned conductive magnetic metal may also be used, or a metal having a relative magnetic permeability and/or conductivity outside such a range may also be used. In addition, as the second metal, one metal may also be included, and two or more metals may also be included. The type of the second metal is not particularly limited as long as it is different from the applied conductive magnetic metal, and for example, one or more metals, which are different from the conductive magnetic metal, may be applied from copper, phosphorus, molybdenum, zinc, manganese, chromium, indium, tin, silver, platinum, gold, aluminum or magnesium, and the like, without being limited thereto.

The metal powder may also comprise components other than metal, if necessary, in addition to the metal components such as the conductive magnetic metal and the second metal. Such a component may be exemplified by various ceramic materials or Si-based polymers, and the like, but is not limited thereto.

The ratio of the conductive magnetic metal in the metal powder is not particularly limited. For example, the ratio can be adjusted so that an appropriate Joule heat can be generated in an electromagnetic field. For example, the metal powder may comprise the conductive magnetic metal in an amount of 30 wt % or more based on the weight of the entire metal powder. In another example, the ratio of the conductive magnetic metal in the metal powder may be is about 35 wt % or more, about 40 wt % or more, about 45 wt % or more, about 50 wt % or more, about 55 wt % or more, 60 wt % or more, 65 wt % or more, 70 wt % or more, 75 wt % or more, 80 wt % or more, 85 wt % or more, or 90 wt % or more. The upper limit of the conductive magnetic metal ratio is not particularly limited. For example, the ratio of the conductive magnetic metal in the metal powder may be less than about 100 wt % or 95 wt % or less. However, the ratio is an exemplary ratio. For example, since the heat generated by induction heating by application of an electromagnetic field can be adjusted according to the intensity of the applied electromagnetic field, the electrical conductivity and resistance of the metal, the ratio can be changed according to specific conditions.

The shape of the metal powder may also be selected in consideration of the melting and sintering efficiency, and the formation efficiency of the three-dimensional shape, and for example, the metal powder may have the shape described in the item of the conductive magnetic metal particles.

The metal powder may have an appropriate range of particle diameter. For example, the metal powder may have a particle diameter (D50) of 50% particle size distribution in a range of about 100 nm to about 100 μm. In another example, the 50% particle diameter (D50) may be about 200 nm or more, about 400 nm or more, about 600 nm or more, about 800 nm or more, about 1,000 nm or more, about 1,500 nm or more, about 2,000 nm or more, about 2,500 nm or more, about 3,000 nm or more, about 3,500 nm or more, about 4,000 nm or more, about 4,500 nm or more, about 5,000 nm or more, or about 5,500 nm or more. In another example, the average particle diameter may be about 90 μm or less, 80 μm or less, 70 μm or less, 60 μm or less, 50 μm or less, 40 μm or less, 30 μm or less, 20 μm or less, 15 μm or less, or 10 μm or less. By maintaining the 50% particle diameter (D50) of the metal powder in the above range, the metal powder can be melted or sintered in an appropriate range in the electromagnetic field, and simultaneously the three-dimensional shape can also be effectively formed.

The three-dimensional shape may also be formed by using the metal powder, and if necessary, it may also be formed by preparing the metal powder in the form of a slurry and using this slurry. The three-dimensional shape may be formed while spraying such a metal powder or slurry, for example, with an inkjet printer or other injection means.

In order to prepare the slurry form, the metal powder may be mixed with a binder. Thus, the slurry may comprise a binder together with the metal powder.

The kind of binder that can be applied in the present application is not particularly limited. As the binder, for example, alkyl cellulose, polyalkylene carbonate, polyalkylene oxide, lignin or a polyvinyl alcohol-based binder may be used. Here, the alkyl cellulose may be exemplified by alkyl cellulose or the like having an alkyl group with 1 to 20 carbon atoms, 1 to 16 carbon atoms, 1 to 12 carbon atoms, 1 to 8 carbon atoms or 1 to 4 carbon atoms, such as methyl cellulose or ethyl cellulose, the polyalkylene oxide may be exemplified by polyalkylene oxide having an alkylene group with 1 to 20 carbon atoms, 1 to 16 carbon atoms, 1 to 12 carbon atoms, 1 to 8 carbon atoms, or 1 to 4 carbon atoms, such as polyethylene oxide or polypropylene oxide, the polyalkylene carbonate may be exemplified by polyalkylene carbonate or the like having an alkylene group with 1 to 20 carbon atoms, 1 to 16 carbon atoms, 1 to 12 carbon atoms, 1 to 8 carbon atoms, or 1 to 4 carbon atoms, such as polyethylene carbonate, and the polyvinyl alcohol-based binder may be exemplified by polyvinyl alcohol or polyvinyl acetate, and the like, without being limited thereto.

The slurry may comprise, for example, the binder in a ratio of about 5 to 200 parts by weight relative to 100 parts by weight of the metal powder. In another example, the ratio of the binder may be about 190 parts by weight or less, 180 parts by weight or less, 170 parts by weight or less, 160 parts by weight or less, 150 parts by weight or less, 140 parts by weight or less, 130 parts by weight or less, 120 parts by weight or less, 110 parts by weight or less, 100 parts by weight or less, 90 parts by weight or less, 80 parts by weight or less, 70 parts by weight or less, 60 parts by weight or less, 50 parts by weight or less, 40 parts by weight or less, or 30 parts by weight or less. In such a range, physical properties, such as viscosity, of the slurry and a dispersion degree of the metal powder can be controlled to be suitable for 3D printing.

The slurry may also comprise, in addition to the above-mentioned components, known additives which are additionally required. An example of such an additive may be exemplified by a solvent or a dispersant, and the like, but is not limited thereto.

In the present application, the three-dimensional shape can be formed in an electromagnetic field by using the slurry or the metal powder as above, or the three-dimensional shape can be formed after passing the metal powder or slurry through the electromagnetic field. As described above, the conductive magnetic metal generates heat under an electromagnetic field, whereby the three-dimensional shape can be formed by sintering. The method may be carried out only by induction heating by an electromagnetic field or may also be carried out while applying appropriate heat.

If the conductive magnetic metal is held in an electromagnetic field, eddy currents are generated in the metal, where Joule heat is generated by resistance of the metal. In the present application, 3D printing can be performed by applying this phenomenon. For example, the three-dimensional shape can be realized in an electromagnetic field using the above-mentioned metal powder or slurry, and melted and sintered, or the three-dimensional shape can be formed using the metal powder or slurry appropriately melted by passing it through an electromagnetic fields. In the present application, a precise three-dimensional shape can be formed within a short time by applying this method.

For example, a method of spraying the metal powder or the like to an area where an electromagnetic field is formed by a coil or the like using an appropriate injection nozzle such as an inkjet nozzle, or winding a coil or the like around the injection nozzle and spraying the metal powder under an electromagnetic field, or the like can be applied.

The electromagnetic field can be formed by applying a current of, for example, 100 A to 1,000 A or so. In another example, the magnitude of the applied current may be 900 A or less, 800 A or less, 700 A or less, 600 A or less, 500 A or less, or 400 A or less. In another example, the magnitude of the current may be about 150 A or less, about 200 A or less, or about 250 A or less.

Furthermore, the electromagnetic field may be formed at a frequency of, for example, about 100 kHz to 1,000 kHz. In another example, the frequency may be 900 kHz or less, 800 kHz or less, 700 kHz or less, 600 kHz or less, 500 kHz or less, or 450 kHz or less. In another example, the frequency may be about 150 kHz or more, about 200 kHz or more, or about 250 kHz or more.

The holding time of the metal powder or slurry under an electromagnetic field formed in the above manner is not particularly limited and may be selected in consideration of the melting or sintering efficiency and the maintenance capability of the three-dimensional shape. For example, the holding time can be adjusted within a range of about 1 minute to 10 hours. In another example, the holding time may be about 9 hours or less, about 8 hours or less, about 7 hours or less, about 6 hours or less, about 5 hours or less, about 4 hours or less, about 3 hours or less, about 2 hours or less, about 1 hour or less, or about 30 minutes or less.

The above-mentioned induction heating conditions, that is, the electromagnetic field forming conditions and the holding time therein may be changed in consideration of the particle diameter or shape of the metal powder, or the composition of the slurry containing the metal powder, or the like.

The melting or sintering of the metal powder or the like in the 3D printing may be performed only by the above-mentioned induction heating, or may also be performed while applying an appropriate heat, if necessary, together with the induction heating, that is, the application of the electromagnetic field.

Advantageous Effects

The present application can provide as a method for efficiently performing 3D printing, for example, a 3D printing method capable of more rapidly and efficiently producing a three-dimensional shape precisely realized up to a fine portion.

BRIEF DESCRIPTION OF DRAWINGS

FIG. 1 is a photograph of a three-dimensional shape obtained in Example 1.

MODE FOR INVENTION

Hereinafter, the present application will be described in detail by way of examples and comparative examples, but the scope of the present application is not limited to the following examples.

Example 1

2 g of a nickel powder (spherical, particle diameter (D50) of 50% particle size distribution: about 7 to 8 μm) and 0.2 g of ethyl cellulose were dispersed in 5 g of methylene chloride to prepare a slurry. Here, the nickel powder has a conductivity of about 14.5 MS/m at 20° C. and a relative magnetic permeability of about 600. Subsequently, the slurry was discharged by using a dispenser to form a three-dimensional shape (line shape), and the three-dimensional shape was calcined by applying an electromagnetic field to the three-dimensional shape. The electromagnetic field was formed by applying a current of 200 A at a frequency of about 350 kHz and the three-dimensional shape was maintained in the electromagnetic field for about 30 seconds.

Example 2

A three-dimensional shape was formed in the same manner as in Example 1 except that the amount of ethyl cellulose was changed to 2.5 g upon preparing the slurry, and an electromagnetic field was applied.

Example 3

A three-dimensional shape was formed in the same manner as in Example 1 except that a nickel powder having a needle shape and having a long axis length of about 10 μm was used instead of the spherical nickel powder, and an electromagnetic field was applied.

Example 4

A three-dimensional shape was formed in the same manner as in Example 1 except that a nickel powder having a dendritic shape and having a long axis length of about 8 μm was used instead of the spherical nickel powder, and an electromagnetic field was applied.

Example 5

A three-dimensional shape was formed in the same manner as in Example 1 except that a spherical iron (Fe) powder (spherical, particle diameter (D50) of 50% particle size distribution: about 6 to 8 μm) was used instead of the nickel powder, and an electromagnetic field was applied. Here, the iron powder has a conductivity of about 13 MS/m at 20° C. and a relative magnetic permeability of about 100,000.

Example 6

2 g of an iron (Fe) powder (spherical, particle diameter (D50) of 50% particle size distribution: about 6 to 8 μm) and 0.5 g of methyl cellulose were dispersed in 5 g of water to prepare a slurry, and a three-dimensional shape was formed in the same manner as in Example 1. Thereafter, the three-dimensional shape was calcined by applying electromagnetic fields stepwise to the three-dimensional shape. To the three-dimensional shape, an electromagnetic field formed by applying a current of 100 A at a frequency of 200 kHz was applied for 10 seconds, an electromagnetic field formed by applying a current of 300 A at a frequency of 350 kHz was applied for 30 seconds and an electromagnetic field formed by applying a current of 500 A at a frequency of 380 kHz was applied for 10 seconds in sequence.

Example 7

A three-dimensional shape was formed in the same manner as in Example 6 except that polyvinyl alcohol was used instead of methyl cellulose, and an electromagnetic field was applied.

Example 8

A three-dimensional shape was formed in the same manner as in Example 6 except that a cobalt (Co) powder (particle diameter (D50) of 50% particle size distribution: about 10 to 14 μm) was used instead of the nickel powder, and an electromagnetic field was applied. Here, the cobalt powder has a relative magnetic permeability of about 280 at 20° C.

Example 9

A three-dimensional shape was formed in the same manner as in Example 6 except that polypropylene carbonate was used instead of methyl cellulose, and an electromagnetic field was applied.

Comparative Example 1

A nickel wire (diameter: about 0.15 mm) was repeatedly discharged onto a substrate while passing through a solenoid coil (300 A, 370 kHz) to form a three-dimensional shape (line shape) in the same manner as in Example 1. However, when the nickel wires passing through the solenoid coil were laminated in a multilayer, adhesiveness between the layers was not sufficiently secured, and the portions not adhered were also confirmed, and the distinction between the layers was surely recognized.

Experimental Example. Resolution

It was confirmed whether a three-dimensional shape having a line-shaped thickness of about 100 μm could be formed in each width of 10 μm, 50 μm, 100 μm and 500 μm by the methods of Examples and Comparative Example, respectively (resolution evaluation). Furthermore, each of the formed three-dimensional shapes was drawn transversely with a spatula to confirm retentive force of the three-dimensional shape. In the above step, if the three-dimensional shape was retained, it was marked as passed in Table 1 below, and if it was not retained, it was marked as failed in Table 1 below.

TABLE 1

| | | Three-dimensional shape retentive force | | | |
|---|---|---|---|---|---|
| | Resolution Evaluation | 10 μm width | 50 μm width | 100 μm width | 500 μm width |
| Example 1 | Formable to 10 μm width | Passed | Passed | Passed | Passed |
| Example 2 | | Failed | Passed | Passed | Passed |
| Example 3 | | Failed | Passed | Passed | Passed |
| Example 4 | | Failed | Passed | Passed | Passed |
| Example 5 | | Failed | Passed | Passed | Passed |
| Example 6 | | Passed | Passed | Passed | Passed |
| Example 7 | | Failed | Passed | Passed | Passed |
| Example 8 | | Failed | Failed | Passed | Passed |
| Example 9 | | Failed | Passed | Passed | Passed |
| Comparative Example 1 | Not formable to 10 μm width and 50 μm width | Not measurable | Not measurable | Passed | Passed |

From the above results, it can be confirmed that according to the method of the present application, a very precise three-dimensional shape can be reliably formed, and it can be confirmed that the effect can be further improved through control of the ratio of the binder and the like.

The invention claimed is:

1. A 3D printing method comprising:
   forming a three-dimensional shape comprising a slurry, and
   applying an electromagnetic field to the three-dimensional shape comprising the slurry,
   wherein the slurry comprises a metal powder and a binder,
   wherein the metal powder comprises a conductive metal having a relative magnetic permeability of 90 or more,
   wherein the metal powder comprises the conductive metal in an amount of 30 weight % or more based on a total weight of the metal powder, and
   wherein the electromagnetic field is formed by applying a current in a range of 100 A to 1,000 A,
   wherein the slurry comprises the binder in an amount of 5 to 200 parts by weight relative to 100 parts by weight of the metal powder comprising the conductive metal.

2. The 3D printing method according to claim 1, wherein the conductive metal has a conductivity of 8 MS/m or more at 20° C.

3. The 3D printing method according to claim 1, wherein the conductive metal is nickel, iron or cobalt.

4. The 3D printing method according to claim 1, wherein the metal powder comprises the conductive metal in an amount of 35 weight % or more based on the total weight of the metal powder.

5. The 3D printing method according to claim 1, wherein the metal powder has a particle diameter of 50% particle size distribution in a range of 100 nm to 100 μm.

6. The 3D printing method according to claim 1, wherein the metal powder is a spherical, flake, ellipsoid, needle or dendritic shape.

7. The 3D printing method according to claim 1, wherein the binder is alkyl cellulose, polyalkylene oxide, polyalkylene carbonate, polyvinyl alcohol or lignin.

8. The 3D printing method according to claim 1, wherein the slurry comprises 5 to 190 parts by weight of the binder relative to 100 parts by weight of the metal powder.

9. The 3D printing method according to claim 1, wherein the electromagnetic field is formed by applying a current at a frequency in a range of 100 kHz to 1,000 kHz.

10. The 3D printing method according to claim 1, wherein the magnetic permeability of the conductive metal is from 90 to about 300,000, and wherein the amount of the conductive metal is from 30 weight % to less than about 100 weight % relative to 100 parts by weight of the metal powder comprising the conductive metal.

11. The 3D printing method according to claim 1, wherein the magnetic permeability of the conductive metal is from 95 to about 300,000, wherein the amount of the conductive metal is from 35 weight % to 95 weight % relative to 100 parts by weight of the metal powder comprising the conductive metal.

12. The 3D printing method according to claim 1, wherein the electromagnetic field is applied to the three-dimensional shape such that the metal powder is melted or sintered under the electromagnetic field.

13. A 3D printing method comprising:
forming a three-dimensional shape comprising a slurry while applying an electromagnetic field,
wherein the slurry comprises a metal powder and a binder,
wherein the metal powder comprises a conductive metal having a relative magnetic permeability of 90 or more,
wherein the metal powder comprises the conductive metal in an amount of 30 weight % or more based on a total weight of the metal powder, and
wherein the slurry comprises the binder in an amount of 5 to 200 parts by weight relative to 100 parts by weight of the metal powder comprising the conductive metal.

14. A 3D printing method comprising:
forming a three-dimensional shape comprising a slurry subsequent to applying an electromagnetic field to the slurry,
wherein the slurry comprises a metal powder and a binder,
wherein the metal powder comprises a conductive metal having a relative magnetic permeability of 90 or more,
wherein the metal powder comprises the conductive metal in an amount of 30 weight % or more based on a total weight of the metal powder, and
wherein the slurry comprises the binder in an amount of 5 to 200 parts by weight relative to 100 parts by weight of the metal powder comprising the conductive metal.

* * * * *